United States Patent [19]

Barber

[11] 4,063,327
[45] Dec. 20, 1977

[54] VEHICLE WASHING APPARATUS WITH IMPROVED REAR WASHER

[75] Inventor: Ivan J. Barber, Mississauga, Canada
[73] Assignee: The Allen Group, Inc., Melville, N.Y.
[21] Appl. No.: 684,071
[22] Filed: May 7, 1976
[51] Int. Cl.² .................................................. B60S 3/06
[52] U.S. Cl. ............................... 15/53 AB; 15/DIG. 2
[58] Field of Search ............ 15/DIG. 2, 53 A, 53 AB, 15/97 R

[56] References Cited

U.S. PATENT DOCUMENTS

| 3,332,098 | 7/1967 | Smith | 15/53 AB |
| 3,497,894 | 3/1970 | Oldham | 15/53 AB |
| 3,593,357 | 7/1971 | Oldham | 15/53 AB |
| 3,624,851 | 12/1971 | Barber | 15/53 AB |

*Primary Examiner*—Edward L. Roberts
*Attorney, Agent, or Firm*—Fulwider, Patton, Rieber, Lee & Utecht

[57] ABSTRACT

A vehicle washing apparatus is provided with an improved side and rear washing brush system. A generally cylindrical side and rear washing brush is provided which is mounted for rotation about a vertical axis at the end of an arm terminating in upper and lower lateral members that carry the brush. The arm is rotatably mounted for lateral rotational movement with respect to a washing station framework and is biased so that the brush contacts the side of the vehicle as the vehicle moves through the washing station. As the vehicle passes the brush, a biasing means rotates the arm and forces the brush in behind the vehicle to maintain contact therewith and to traverse the rear of the vehicle with a force greater than that applied to hold the brush in contact with the side of the vehicle.

10 Claims, 7 Drawing Figures

DIRECTION OF VEHICLE TRAVEL

100 PSI AIR SUPPLY

VAC

VEHICLE WASHING APPARATUS WITH IMPROVED REAR WASHER

FIELD OF THE INVENTION

The present invention relates to an apparatus for washing vehicles as they are drawn through a vehicle washing station.

BACKGROUND OF THE INVENTION

In existing vehicle washing systems, a plurality of generally cylindrical brushes are mounted about vertical axes and are rotated to scrub a vehicle as the vehicle is propelled through a washing station. Some or all of the brushes are mounted upon the free ends of rotatable arms which are bifurcated at their free ends to receive the axles about which the brushes rotate and which are fastened to a washing station framework for lateral rotation with respect thereto. These arms are biased into contact with a side of a vehicle passing through the station. In addition, certain of the brushes may be biased to press inward behind the vehicle once the vehicle has passed the brush position in order to clean the rear of the vehicle. However, it has been found that existing systems inadequately wash the rear surfaces of vehicles. Since the vehicle is moving forward and the brushes are pressed either to the rear or inwardly from the sides, conventional brushes make minimal contact with the rear of the vehicle.

SUMMARY OF THE INVENTION

It is an object of the present invention to provide a vehicle washing system which increases the time and pressure of brush contact with the rear of a vehicle passing through a washing station.

A related object is the provision of a brush which is mounted on the free end of an arm rotatably secured to a washing station framework and which is biased to rotate in behind the vehicle as the vehicle passes through the washing station. Moreover, the rotational moment applied to the arm upon which the brush is mounted is increased beyond the biasing force used to hold the brush in contact with the side of the vehicle.

A further object of the invention is the provision of two different brushes mounted on rotatable arms and arranged to laterally traverse the front and rear respectively of a vehicle passing through the washing station. Such a system more thoroughly brushes both the transverse front and rear surfaces of the vehicle as compared with conventional systems. This feature is particularly important in washing vehicles having large front and rear surface areas to be cleaned, such as buses and trucks.

DETAILED DESCRIPTION OF THE INVENTION

Figure 1:
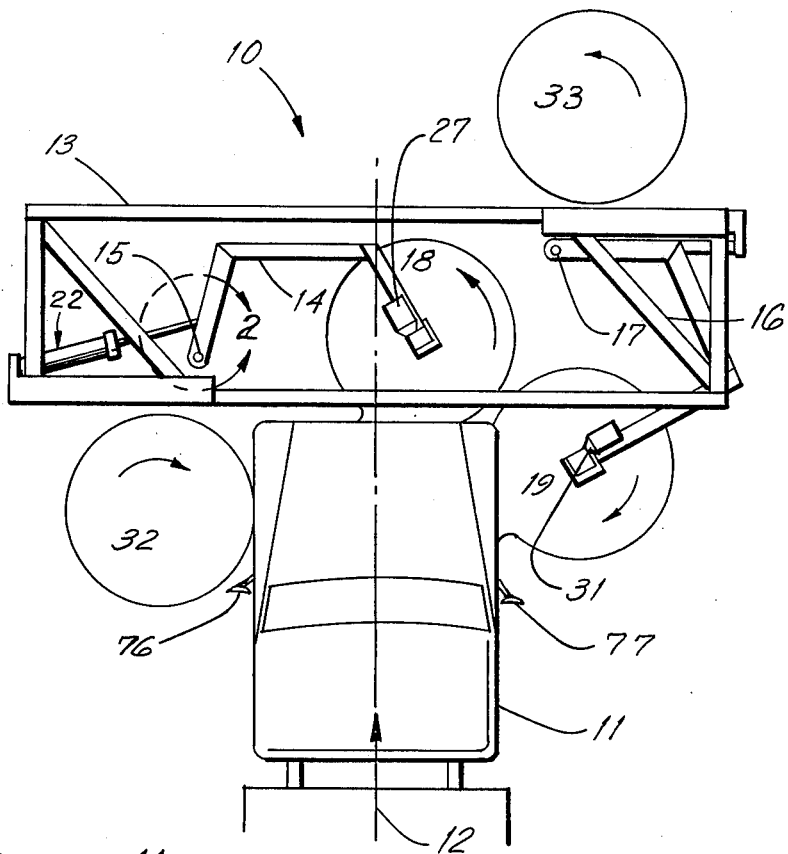
FIG. 1 is a plan view of the vehicle washing apparatus of the invention with the brushes in their parked positions.
Figure 2:
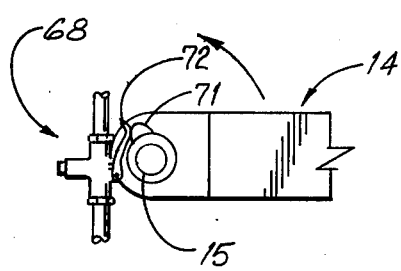
FIG. 2 is an enlarged view of one of the actuator controls of the invention located as indicated in FIG. 1.

According to the present invention, a vehicle washing apparatus 10 is provided for scrubbing a vehicle 11 as it travels along a predetermined path 12. The vehicle washing apparatus 10 includes a framework 13 positioned across the path 12 with an opening or arch therethrough allowing passage of the vehicle 11. An arm 14 is provided and is rotatably mounted on the framework 13 at one end at a vertically extending axis 15 on a first side of said path 12. The arm 14 laterally projects across the path 12 toward the second and opposite side thereof while in a waiting or parked position. The arm 14 terminates in a free end which may be rotated forwardly about the axis 15 across the path 12 toward the side upon which it is mounted. A second arm 16 is rotatably mounted on the framework 13 at one end about a vertically extending axis 17 on the other side of the path 12 to project rearwardly in general alignment with the path 12 while in a waiting or parked position. The arm 16 terminates in a free end which is rotatable from the parked position during a rear wash condition in which it swings inwardly toward the path 12 and forwardly from the parked position. Vertically extending rotary brushes 18 and 19 are mounted at the free ends of the respective arms 14 and 16 for rotation about their respective vertical axes 15 and 17. Motors 20 and 21 serve as drive means for rotating respectively the brushes 18 and 19. A biasing means including a hydraulic cylinder 22 as the operative element is connected to the arm 14 for normally biasing it toward its parked position. Another biasing means including a hydraulic cylinder 23 as the operative element is connected to arm 16 and is operative upon receipt of a pressure signal to apply a predetermined force to arm 16 toward the path 12 and against a side of the vehicle 11.

This force is sufficient to ensure that brush 19 maintains contact with the vehicle, but is not so great as to cause damage to the right hand mirror 77 or to force brush 19 into the gap between a truck tractor and its trailer.

Upon receipt of a rear wash signal, the cylinder 23 biases the arm 16 inwardly and forwardly with a rear wash force greater than the predetermined force previously applied. Side wash control means including valves and pneumatic lines hereinafter to be described is connected between arm 14 and the second biasing means and is operative upon forward movement of arm 14 from its parked position to apply the pressure signal to actuate hydraulic cylinder 23. This forces the rotary brush 19 against a side of the vehicle 11 passing along path 12 whereby the arm 16 is held in contact therewith. A rear wash control means likewise including valves and pneumatic lines, hereinafter to be described, is coupled between arm 16 and the hydraulic cylinder 23 and is operative in response to movement of arm 16 inwardly toward the path 12. This occurs when vehicle 11 passes and its side no longer offers resistance to the predetermined force theretofore applied. The rear wash control means applies the rear wash signal to the hydraulic cylinder 23 which in turn acts upon the arm 16 as it moves inwardly toward path 12. This allows rotary brush 19 to maintain contact with the rear of vehicle 11 as it passes along path 12.

The front and rear brush support arms 14 and 16 are disposed on opposite sides of the path 12 as indicated in the drawings. One end of each of the arms 14 and 16 is fastened to the framework 13 for rotation about vertical axes 15 and 17 respectively. The arm 14 is bifurcated with upper and lower lateral segments 24 and 25 extending from the axis 15 to terminate in free ends which carry a vertical axle 26. The generally cylindrical vertically extending brush 18 is mounted for rotation about the axle 26. A motor 27 is engaged to drive the axle 26 to rotate the brush 18 in a counterclockwise direction as indicated, and is mounted atop the upper segment 24 of arm 14 at its free end.

Similarly, arm 16 is bifurcated and includes upper and lower lateral segments 28 and 29 extending from the axis 17 and terminating at their free ends where the carry a vertical axle 30. The generally cylinderal brush 19 extends vertically between the lateral segments 28 and 29 and is rotated about the axle 30 in a counterclockwise direction by the motor 31 which is carried atop the free end of the upper lateral segment 28.

Besides the brushes 18 and 19 auxiliary brushes 32 and 33 are additionally provided. The brushes 32 and 33 are generally cylindrical and are rotatable about vertically extending axes which are stationary with respect to the framework 13. The auxiliary brushes 32 and 33 serve to assist in cleaning the sides of vehicle 12 as the vehicle is drawn through the arch in the framework 13 in the washing station. The brush 32 rotates in a clockwise direction while the brush 33 rotates in a counterclockwise direction so as to maximize the scrubbing action against the vehicle as the vehicle moves along the path 12 and so as to provide scrubbing in directions opposite to the directions of rotation of brushes 18 and 19 respectively.

Figure 4:
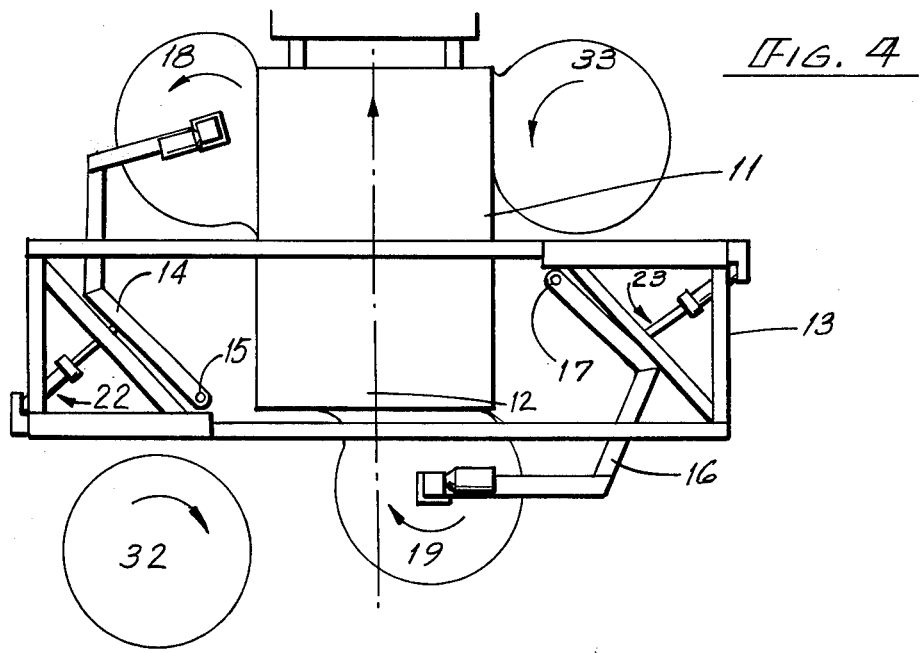
FIG. 4 is a diagram similar to FIG. 3 showing the brush positions as the vehicle draws past the side and rear brush of the system.
Figure 5:
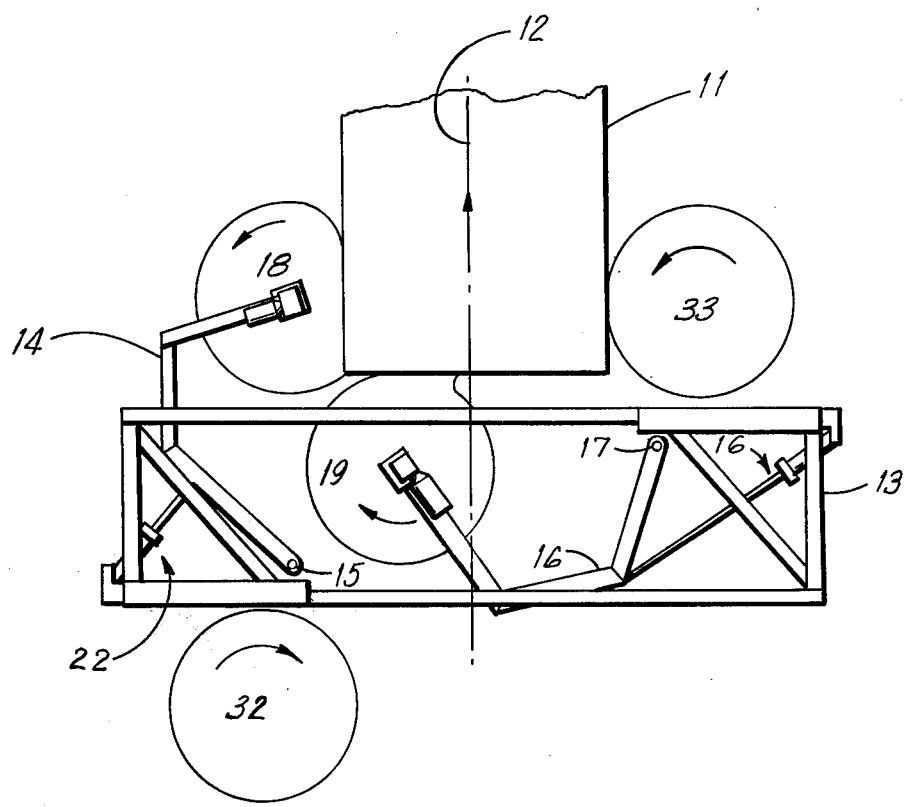
FIG. 5 is a plan view illustrating the manner in which the rear of the vehicle is brushed according to the present invention.
Figure 6:
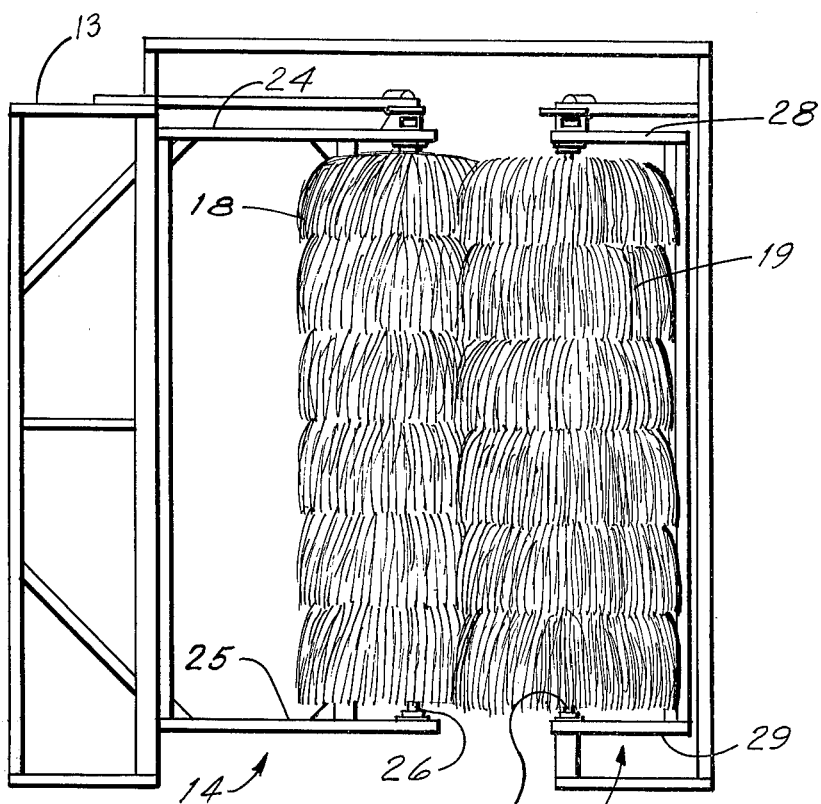
FIG. 6 is an elevational view of the brushes mounted on arms rotatably fastened to the washing station framework in the waiting positions.

The double acting cylinder 22 acts to bias the arm 14 in a clockwise direction about the axis 15 when the arm 14 is in its parked position as indicated in FIG. 1. Biasing may be reversed to force arm 14 counterclockwise into a side wash position as illustrated in FIGS. 4 and 5. In this manner the left side mirror 76 is protected from excessive force acting against it. Also, in the side wash position brush 18 will not be forced into the gap between a tractor truck and its trailer. The arm 16 is rotatable about the vertical axis 17 located on the side of the path 12 opposite from the axis 15. The arm 16 projects rearwardly and is generally aligned with the path 12, during the time that it is in a parked position. When actuated, the cylinder 23 rotates the arm 16 toward the path 12 and in a clockwise direction about the axis 17.

Both of the double acting cylinders 22 and 23 have reciprocal pistons separating closed and apertured ends of the associated cylinder. A piston rod reciprocates within each cylinder through a sliding seal at the apertured end thereof.

Figure 7:
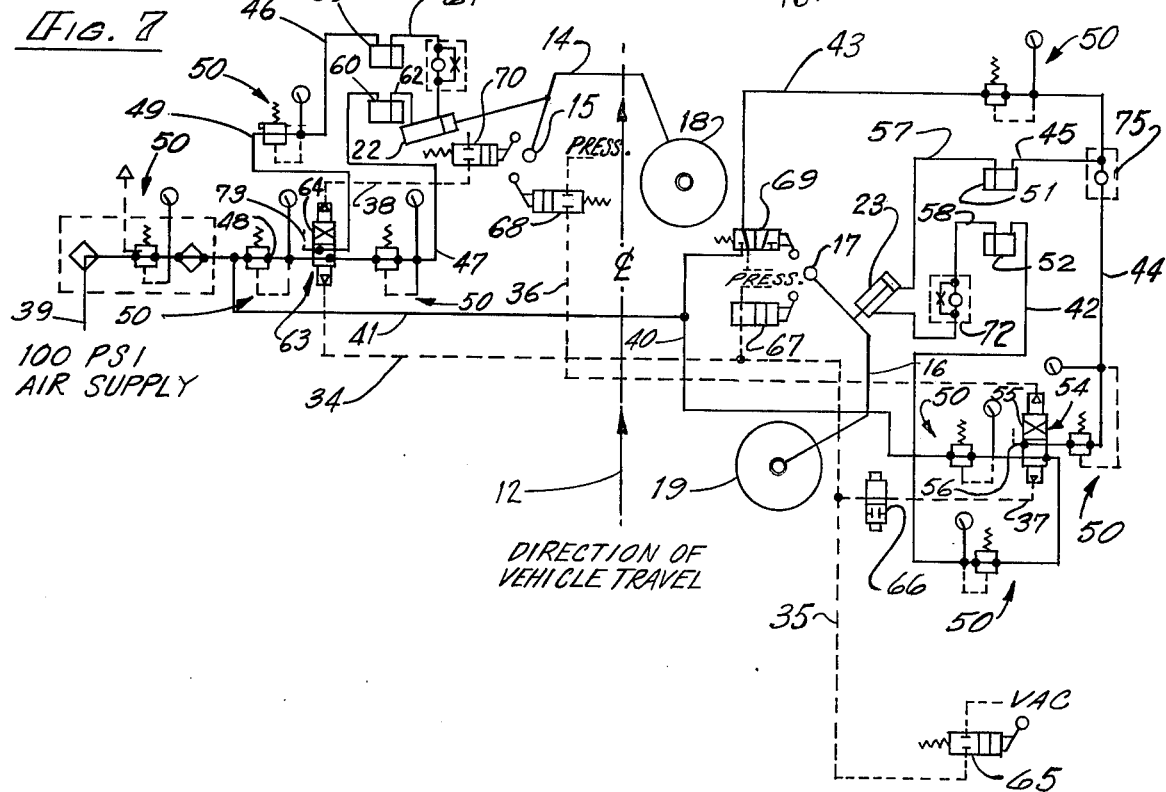
FIG. 7 is a schematic diagram of the fluid control system of the present invention.

High pressure pneumatic and low pressure pilot sources are utilized to actuate cylinders 22 and 23 and are depicted in FIG. 7. The pilot source is depicted in dashed lines and is relatively low pressure pneumatic system comprised of the interconnecting lines 34,35,36,37, and 38. The pilot circuit may be operated by either pressure or vacuum one manner of operation being indicated, and is used as means for pneumatically operating the actuating elements of various of the valves in the system.

The high pressure pneumatic power source includes a 100 pound per square inch pneumatic power supply line as indicated at 39. Various branches of the power supply line are indicated at 40,41,42,43,44 and 45 which act as an intergral part of the side and rear wash control means that controls the movement of arm 16. In addition, other branches of the pneumatice power supply extend to the lines 46,47,48, and 49. In the various branches of the pneumatic power source, pressure relief valve and gauge assemblies 50 are positioned to prevent any dangerous build-up of air pressure.

The liquid reservoirs 51 and 52 are respectively associated with the blind and apertured ends of the double acting cylinder 23. The valve 54 is a four way valve and includes an actuating element 55 in the form of a spool that is longitudinally shuttled within the valve 54 under the control of the pilot source to provide alternative passageways from the power source through line 40 to the reservoirs 51 and 52. The valve 54 also selectively provides a passageway to the pressure relief port 56 from at least one of the reservoirs.

The oil reservoirs 51 and 52 have oil lines 57 and 58 respectively connected to the closed and apertured ends of the cylinder 23. The pneumatic line 42 and lines 44 and 45 are connected to valve 54 and to the reservoirs 52 and 51 and are used to communicate oil into or let the oil return from the lines 58 and 57.

In a similar manner, oil reservoirs 59 and 60 are respectively connected to apertured and blind ends of the double acting cylinder 22 by lines 61 and 62. The construction of cylinder 22 is identical to that of cylinder 23. The pneumatic power source branches 46 and 47 are connected to a valve 63 having a longitudinally movable spool 64, and are also connected respectively to reservoirs 59 and 60 to force air into or bleed air from the associated hydraulic reservoir.

A valve 65 is provided as one possible actuator control for providing vacuum or pressure bleed off for connection to the pilot source. Such a valve is particularly useful for washing tractor trucks with trailers, since it is desireable to delay the clockwise biasing of arm 16 until after the vehicle has progressed a distance along the path 12. This prevents the brush 19 from being forced into the gap between the tractor and its trailer. With this objective in mind, the valve 65 is connected in the line 35 and may be a trip switch located in the path 12 of vehicle travel, or may be a manually operable switch. Another valve 66 is also provided in segment 37 of the pilot line. Valve 66 is a two position valve which alternatively blocks or allows pressure changes to be communicated and is provided in order to allow valve 65 to be isolated from the system. Other valves 67, 68, 69, and 70 are also provided. These valves are cam operated valves and are actuated by movement of the arms 14 and 16 as will hereinafter be described.

In some embodiments of the invention the valve 65 is omitted entirely. In the operation of the vehicle washing system, and with reference to FIG. 7 in conjunction with FIGS. 1 through 5 it can be seen that when there is no vehicle within the opening of the framework 13 at the washing station, the arms 14 and 16 are in the parked positions indicated in FIG. 1. That is, the arm 14 carrying the front brush 18 is extended across the path 12 so that its first point of contact with the approaching vehicle 11 is at the front of the vehicle near the right front corner. The arm 16 holds the brush 19 in the parked position at the right side of the vehicle 11 as the vehicle 11 travels along the predetermined path 12. All of the brushes are driven about their axes in the directions indicated.

As the vehicle enters the washing apparatus, it operates the trip-switch 65. As previously explained, valve 65 is an actuator control and when it is utilized, it provides a side wash signal to connect the pilot source to the actuator element 55 of the valve 54. The valve 65 would normally be employed with narrow vehicles which would not otherwise contact the brush 19 in its parked position. For vehicles of normal width, however, valve 65 is isolated from the system by manual operation of the valve 66 to a position opposite that indicated in FIG. 7.

When the switch 65 is operated, and is not disconnected by valve 66, however, the vacuum of the pilot source acting through the line 35 bleeds air from the pilot circuit and draws the actuator element 55 of the valve 54 downward from the position indicated in FIG. 7. This shifts the four way valve 54 to connect the power source from line 40 to the line 44, and through line 45 to the reservoir 51. The additional air pressure in the reservoir 51 forces oil through the line 57 into the blind end of the cylinder 23 to extend the piston rod and swing the rear arm 14 inwardly to a side wash position where the rear brush 19 contacts the right side of the vehicle. At the same time, the reservoir 52 is connected by means of the pneumatic line 42 through the switch 54 to the pressure relief port 56, thereby bleeding air from the line 42 and allowing oil to be forced through the line 58 into the reservoir 52.

If the valve 65 is isolated or omitted entirely from the system, the rear brush 19 remains retracted in the parked position until the vehicle engages the front brush 18. In such an embodiment arm 14 is forced in a counterclockwise direction as the vehicle 11 is drawn along path 12 to force back the brush 18. A cam 71 at the axis 15 of the arm 14 activates the one way trip-valve 68 which acts through line 36 of the pilot circuit to operate the four way valve 54. Portion 36 of the pilot circuit has a positive pressure, as opposed to the vacuum pressure in the line 35. The positive pilot source pressure is applied to the actuator element 55 of the valve 54 to force The spool 55 from the position indicated in FIG. 7. Thus, even in the absence of the trip switch valve 65, a predetermined force is applied through high pressure pneumatic lines 39,40,44 and 45 to bias the arm 16 inwardly toward path 12 and against the right side of vehicle 11 by virtue of the pressure signal from valve 68 acting upon the actuator element 55. In the instance where the valve 65 is isolated or omitted, the valve 68 and its cam rider 72, coact with the cam 71 to form a side wash control means. As indicated, the side wash control means is connected between the first arm 14 and the hydraulic cylinder 23 by means of the pilot source line 36, the valve 54, and the lines 39,40,41,42,44 and 45 through the reservoirs 51 and 52 and the hydraulic lines 57 and 58 respectively therewith. The side wash control means is operative upon forward movement of the arm 14 from its parked position and applies a pressure signal to the hydraulic cylinder 23.

Figure 3:
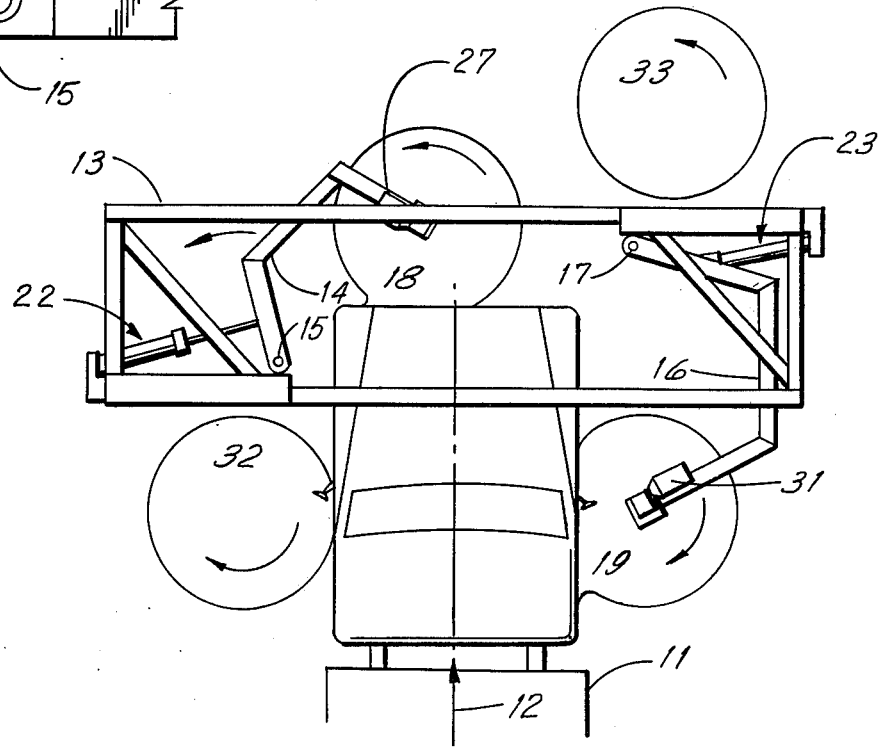
FIG. 3 is a plan view illustrating the initial displacement of the brushes as a vehicle moves forward through the washing station from the position of FIG. 1.

As can be seen from the drawings, the arm 16 is rotatable about the axis 17 from its parked position, as indicated in FIG. 1, to exert pressure against the right side of vehicle 11 as indicated in FIG. 3. Once the right rear corner of vehicle 11 clears brush 19, the arm 16 enters the rear wash condition in which it swings inwardly and forwardly toward the path 12 as indicated in FIG. 4.

To maximize the cleaning effectiveness according to this invention, the hydraulic cylinder 23 applies a greater force to the arm 16 as it moves into the rear wash condition as in FIGS. 4 and 5 than it did previously. This enables the brush 19 to remain in contact with the rear of the vehicle 11 for a much longer period of time and to traverse the width of the vehicle 11 across the rear thereof much more thoroughly than is possible with conventional systems.

The brush 19 enters the rear wash condition under the the control of a cam operated control valve 69 which utilizes the cylinder 23 as an operative element. Prior to the rear wash control signal, a connection is formed between the power source and the cylinder 23 through the reservoirs 51 and 52 and the pneumatic power source and the power connection lines 40,41,44, and 45 previously described. The hydraulic lines 57 and 58 are also included in the connection. As previously indicated, once the valve 68 has been actuated, the rear brush 19 is held in a biased condition against the right side of a vehicle 11 by virtue of an initial pressure within the blind end of the cylinder.

The valve 69 is actuated by the rear brush 19 moving clockwise toward the path 12 about the axis 17. When the valve 69 is opened, increased air pressure is fed from the power source lines 40 and 41 through the connection line 43 to the shuttle valve 75. Valve 75 is operated to accept air from line 43 and to close off line 44. The air in line 43 may be maintained at a higher pressure than is the air in line 44 because of a reduction in pressure interposed in the line 44 by virtue of valve 54. On the other hand, the valve and gauge assemblies 50 in lines 40,43 and 44 may be adjusted to allow a greater pressure to be passed to shuttle valve 75 from line 43 than from line 44. From line 43, air at the elevated pressure acts upon reservoir 51 to communicate additional oil into the blind end of cylinder 23. Thus, the valve 69 is used to generate the rear wash signal with the result that the arm 16 is rotated about the axis 17 with increased force as it is moved inwardly toward the path 12.

Once the arm 16 moves into the rear wash condition, the increased moment enables the brush 19 to remain in contact with the rear of the vehicle 11 in moving from right to left as in FIG. 4. An adjustable damper valve 72 governs the rate at which hydraulic fluid flows through the line 58, thereby providing an upper limit on the angular velocity of arm 16.

While the rear brush 19 is washing the right side of the vehicle, as in FIGS. 1 and 3, the vehicle 11 is drawn forward forcing the front brush 18 to travel across the front of the vehicle from right to left. When the front brush 18 completes washing the front of the vehicle and reaches the left front corner thereof, a cam actuator valve 70 transmits a front brush retraction signal to cylinder 22. The operation of the valve 70 is identical with that of the valve 68 except that the cam actuating the valve 70 is located at a different position of angular alignment on the axis 15 with respect to arm 14 than is the cam 71. Actuation of the valve 70 connects the pneumatic pilot source to a valve 63, which operates in a manner identical to that of the valve 54. The pneumatic pilot source acting through the valve 63 is a positive air pressure source, so that the actuator element 64 in the valve 63 is forced to the position opposite that indicated in FIG. 7.

This shift of the actuator 64 relieves air pressure from the reservoir 60 and increases the pressure to the apertured end of the cylinder 22. This is accomplished since the path from the reservoir 60 through the power source line 47 is connected in a path to the pressure relief port 73 of valve 63. Thus, the front brush 18 is maintained in a side wash position on an opposite side of the path 12 from the brush 19 in its parked position. This side wash position of the brush 18 is indicated in FIG. 4. As previously explained, retraction of the brush 18 to its side wash position aids in protecting the mirror 76.

When the rear brush 19 completes washing the rear of the vehicle, a return actuator control returns the arm 16 to its waiting position. This retraction signal is generated in response to the further clockwise rotational movement of the arm 16 to the desired termination of the rear wash condition. This return actuator control includes the valve 67 which has a cam follower that is contacted by a cam mounted on the axis 17 in the manner previously described. Actuation of the valve 67 forces air into the pneumatic pilot circuit, thus forcing the actuator 55 of the valve 54 back to the position indicated in FIG. 7. This provides a path for the pneumatic power source to force the piston rod back into the cylinder 23 by virtue of pressure applied to the reservoir 52 and pressure relieved from the reservoir 51. This return signal provided to the actuator 55 of the valve 54 thereby causes the arm 16 to return to its parked position indicated in FIG. 1.

At the same time, the valve 67 also provides a return signal to the actuator 64 of the valve 63. The actuator 64 thus returns to the position indicated in FIG. 7 in response to the maximum desired rotation of the arm 16 which is sufficient to open the valve 67. This maximum desired rotation is the limit to which the arm 16 moves in the rear wash condition. When this return signal is provided to the valve 63, pressure is supplied to the reservoir 60 and relieved from the reservoir 59. This causes the arm 14 to return to its initial parked position as in FIG. 1.

It is to be understood that the maximum desired rotation of the arm 16 would be approximately that which would bring the brush 19 into position to extend across the rear to the left rear corner of the vehicle 11. If the return signal were to be generated too early, valve 63 would be actuated prematurely before the vehicle 11 had cleared the brush 18.

From the embodiment of the invention depicted, it is to be understood that various conventional components can be used for the valves, cylinders, and reservoirs depicted.

I claim:

1. A vehicle washing apparatus for scrubbing a vehicle as it travels along a predetermined path, comprising:
   a. a framework positioned across said path with an opening therethrough allowing passage of a vehicle;
   b. a first arm rotatably mounted on said framework at one end on a first side of said path to normally project across said path toward the second and opposite side thereof while in a parked position and terminating in a free end rotatable forwardly across said path toward said first side;
   c. a second arm rotatably mounted on said framework at one end on said second side of said path to normally project rearwardly while in a parked position and terminating in a free end which is rotatable toward said path from said parked position during a rear wash condition in which it swings inwardly toward said path and forwardly from said parked position;
   d. first and second vertically extending rotary brushes mounted at the free ends of the respective first and second arms for rotation about respective vertical axes;
   e. drive means for rotating said first and second brushes;
   f. first biasing means connected to said first arm for biasing said first arm toward its parked position;
   g. second biasing means connected to said second arm and operative upon receipt of a pressure signal to apply a predetermined force to said second arm tending to force said second arm toward said path and against a side of said vehicle and upon receipt of a rear wash signal to bias said second arm inwardly and forwardly with a rear wash force greater than said predetermined force;
   h. side wash control means connected between said first arm and said second biasing means and operative upon forward movement of said first arm from its parked position to apply said pressure signal to said second biasing means to force said second rotary brush against a side of said vehicle passing along said predetermined path, whereby said second arm is held in contact therewith;
   i. rear wash control means coupled between said second arm and said second biasing means and operative in response to movement of said second arm inwardly toward said path which occurs when said vehicle passes and its side no longer offers resistance to said predetermined force, to apply said rear wash signal to said second biasing means whereby said second biasing means applies said rear wash force to said second arm as said second arm moves inwardly toward said path, thereby, allowing said second rotary brush to maintain contact with the rear of a vehicle as it passes along said path.

2. The vehicle washing apparatus of claim 1 wherein said pressure signal acts through said second biasing means to rotate said second arm inwardly toward said path to contact a vehicle passing therealong to a side wash position in a position of rotational alignment between said parked position and said rear wash condition.

3. The vehicle washing apparatus of claim 1 wherein said side wash control means comprises: a double acting hydraulic cylinder having a reciprocal piston separating closed and apertured ends of said cylinder, a pneumatic power source, a pneumatic pilot source, a separate liquid reservoirs associated with said closed and apertured ends of said double acting cylinder, a valve mechanism having a pressure relief port and connected to said pneumatic power source and to both of said reservoirs of said cylinder, and including an actuating element operated under the control of said pilot source to provide alternative passageways from said power source to said reservoirs and to selectively provide a passageway to said pressure relief port from at least one of said reservoirs, and an actuator control to provide said pressure signal to connect and disconnect said pilot source to said actuator element.

4. The vehicle washing apparatus of claim 3 wherein said actuator control includes a valve operatively connectable to said pilot source and responsive to movement of said first arm through a cam connection with said first arm.

5. The vehicle washing apparatus of claim 3 wherein said actuator control is a valve connection to said pilot source operable by a trip switch located in said predetermined path.

6. The vehicle washing apparatus of claim 2 wherein said rear wash control means comprises a double acting hydraulic cylinder having a reciprocal piston separating closed and apertured ends of said cylinder, a pneumatic power source, separate liquid reservoirs associated with said closed and apertured ends of said double acting cylinder, a first pneumatic connection line joining said pneumatic power source to the liquid reservoir associated with one of said ends of said double acting cylinder at a first pressure, a rear wash actuator control for providing said rear wash signal and comprised of a valve operable in response to movement of said second arm inwardly toward said path, and a second pneumatic connection line joining said pneumatic power source to the aforesaid reservoir associated with the same aforesaid end of said double acting cylinder through said rear wash actuator control at a greater pressure than that in said first pneumatic connection line.

7. The vehicle washing apparatus of claim 6 further comprising an adjustable valve located in said second pneumatic connection line to vary said rear wash force.

8. The vehicle washing apparatus of claim 6 further comprising a pneumatic pilot source, a valve mechanism connected to said pneumatic power source, and to both of said reservoirs and including an actuating element operated under the control of said pilot source to provide alternative passageways from said power source to said reservoirs, and a return activator control connectable to said pneumatic pilot source for providing a return signal to said valve mechanism and operable to return said second arm to its parked position in response to an extreme position of movement of said second arm at the desired termination of said rear wash condition.

9. The vehicle washing apparatus of claim 1 further comprising a double acting hydraulic cylinder having a reciprocal piston separating closed and apertured ends of said cylinder, separate liquid reservoirs associated with said closed and apertured ends of said first double acting cylinder, a pneumatic power source, a pneumatic pilot source, a valve mechanism having a pressure relief port and connected to said pneumatic power source and to both of said reservoirs associated with said double acting cylinder and including an actuating element operated under the control of said pilot source to provide alternative passageways from said power source to each of said reservoirs and to selectively provide a passageway to said pressure relief port, and a front brush retraction control responsive to movement of said first arm to connect said pneumatic pilot source to said valve mechanism to provide a front brush retraction signal to said valve mechanism to operate said actuator element to provide a path from at least one of said reservoirs to said pressure relief port, whereby said front brush is maintained in a side wash position on an opposite side of said path from said second brush in its parked position.

10. The vehicle washing apparatus of claim 9 further comprising a return actuator control connectable to said pneumatic pilot source for providing a return signal to said valve mechanism and operable in response to the maximum desired rotation of said second arm in said rear wash condition whereby said pilot source operates said actuating element to cause said first arm to return to its parked position.

* * * * *